July 5, 1927.

L. A. MULLIGAN 1,634,592

WINDSHIELD REGULATING DEVICE

Filed June 24, 1926    2 Sheets-Sheet 1

Inventor
Leonard A. Mulligan,

Attorneys

July 5, 1927.
L. A. MULLIGAN
1,634,592
WINDSHIELD REGULATING DEVICE
Filed June 24, 1926   2 Sheets-Sheet 2
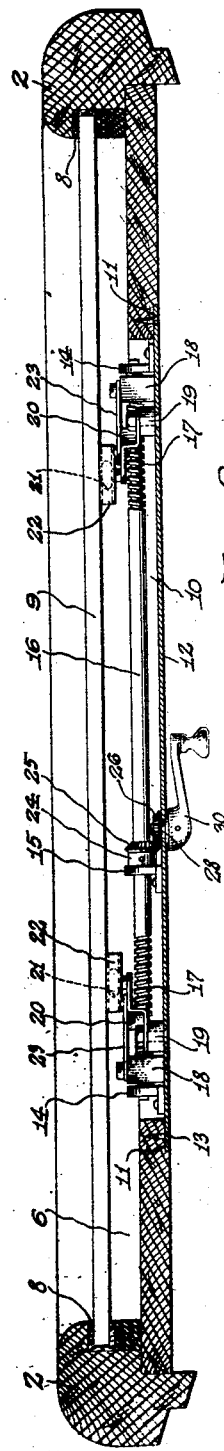
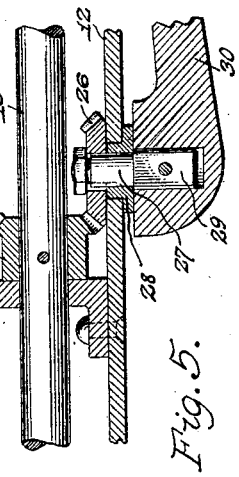
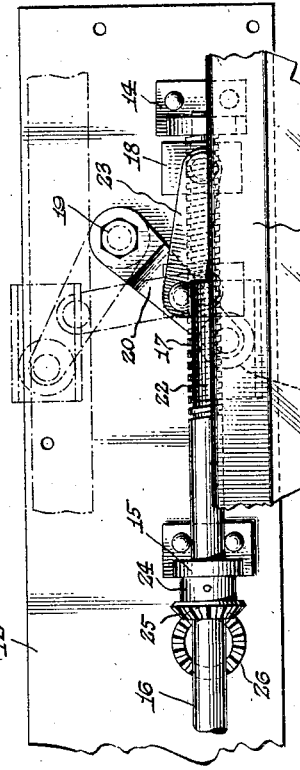
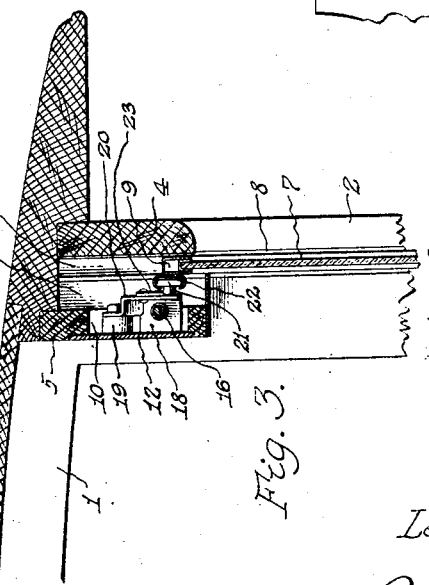
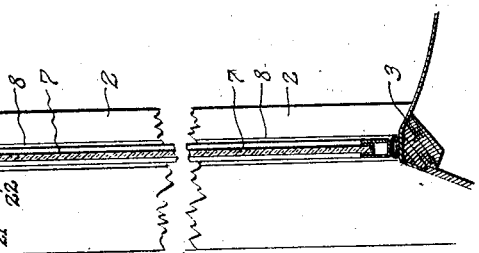
Inventor
Leonard A. Mulligan,
By
Attorneys Patented July 5, 1927.

1,634,592

UNITED STATES PATENT OFFICE.

LEONARD A. MULLIGAN, OF DETROIT, MICHIGAN, ASSIGNOR TO JOSEPH N. SMITH CO., OF DETROIT, MICHIGAN, A CORPORATION OF MICHIGAN.

WINDSHIELD-REGULATING DEVICE.

Application filed June 24, 1926. Serial No. 118,169.

This invention relates to a sash regulating device, and has special reference to that class of sashes, panes, closures, or ventilating members slidably mounted in an automobile windshield frame, body, wall or door for ventilating or clear vision purposes.

My invention aims to provide a simple and durable bench assembled regulating device that has been especially designed for the header of a windshield frame or structure in which a sash is slidably mounted so that the sash be raised to afford a ventilating opening below the sash and in proximity to the cowl of an automobile. It is in connection with the header that the sash regulating device is in an inconspicuous out-of-the-road position, yet accessible to the operator of an automobile for sash adjusting purposes.

My invention further aims to provide a sash regulating device wherein levers, traveler nuts, a screw shaft, and a gear operating mechanism permits of a sash being evenly adjusted with minimum power and without a clutch or other locking device for holding the sash in an adjusted position against accidental movement incident to vibrations of the automobile body.

My invention will be hereinafter specifically described and then claimed, and reference will now be had to the drawings, wherein—

Fig. 2 is a horizontal sectional view of the windshield header showing the sash regulating device in plan;

Fig. 3 is a vertical longitudinal sectional view taken on the line III—III of Figure 1;

Fig. 4 is a front elevation of a portion of the device, and

Fig. 5 is an enlarged horizontal sectional view of the gear operating mechanism of the device.

Figure 1:
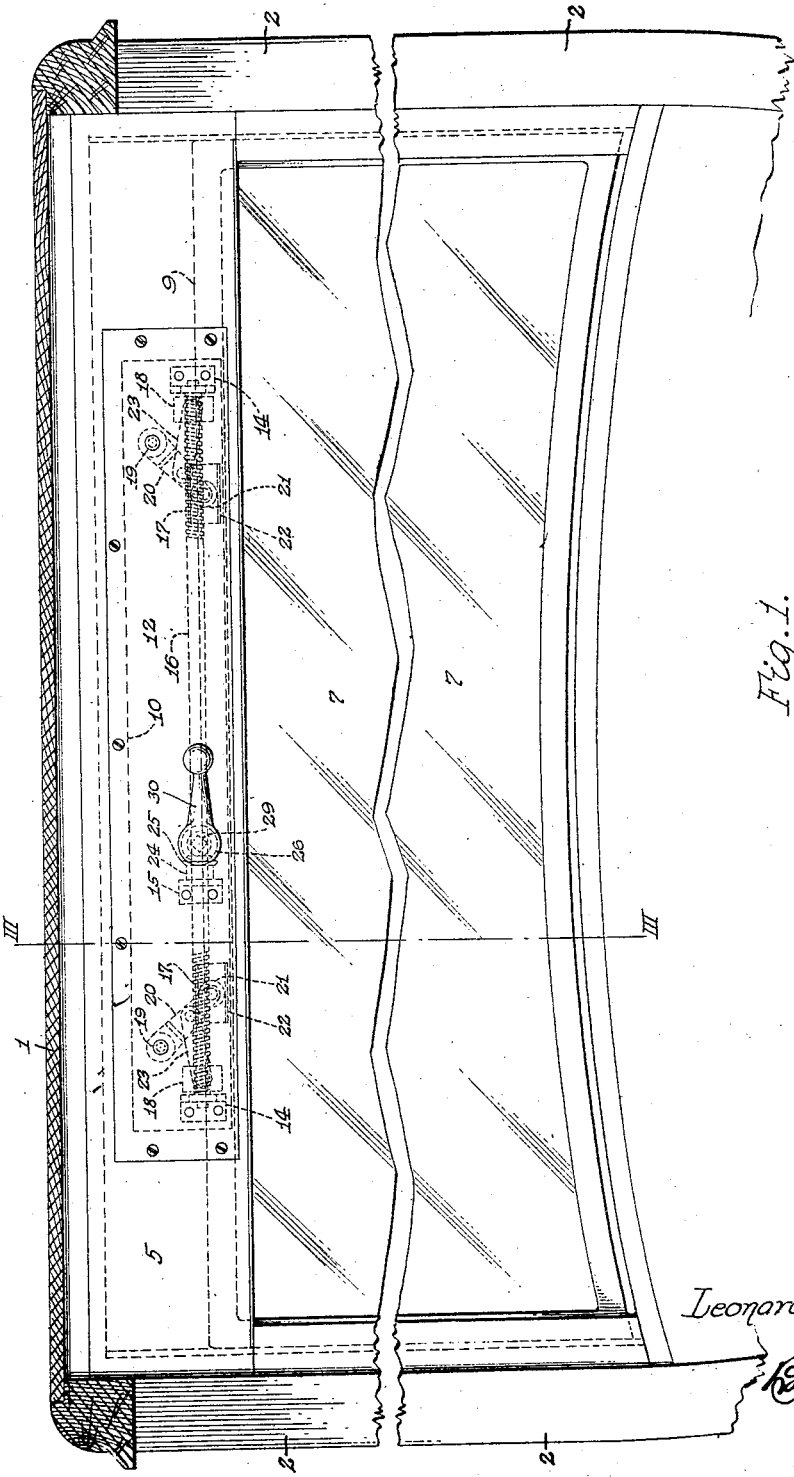
Figure 1 is a cross sectional view of a portion of an automobile body looking towards the windshield thereof and showing my sash regulating device mounted in the windshield header.

In the drawings, the reference numeral 1 denotes a portion of an automobile body or top having a windshield frame or structure which includes stiles 2, a sill 3, and a header composed of an outer facing member 4 and an inner supporting member 5. The facing and supporting members 4 and 5 are in spaced relation so as to form a well or sashway 6 for the upper edge portion of a sash, pane or the like 7, which has its side edges slidable in guides 8 of the stiles 2. The sash 7 may be of that form having a channel frame 9 adapted to seat on the sill 3 and cooperate with the guides 8 and the header in forming a closure at the front end of the automobile body.

The supporting member 5 of the header is provided with an oblong opening 10 and the marginal edges of said opening have a seat 11 for a plate 12 covering said opening and secured to the supporting member 5 by screws 13 or other fastening means. It is on the inner side of the plate 12 that the sash regulating mechanism is assembled and such is a bench job so that the regulating device may be easily and quickly installed in the header of a windshield structure and operatively connected to the sash 7.

On the inner face of the plate 12 are end bearings 14 and an intermediate bearing 15. Journaled in these bearings is a longitudinally disposed rotatable screw shaft 16 having end screwthread portions 17. Operatively engaging these end screwthreaded portions of the shaft are traveler nuts 18 which are held from turning by slidably engaging the inner face of the plate 12, as best shown in Figures 2 and 3.

Mounted on the inner face of the plate 12, adjacent the end bearings 14, are bearings 19 for the pivotally mounted inner ends of levers 20 which are offset, as best shown in Figures 2 and 3, to provide clearance for the screw shaft 16. The outer ends of these levers are operatively connected to the frame 9 of the sash 7 and such connection is established by studs 21 on the outer ends of the levers extending into channel rails 22 carried by the frame 9. The rails 22 are of sufficient length to permit of the studs 21 shifting therein for sash raising or lowering purposes, without any danger of the studs becoming displaced relative to the rails. The studs 21 and the rails 22 are a fair example of establishing an operative connection between the levers 20 and the sash. Obviously the studs 21 may be roller equipped, or various types of anti-frictional devices may be used to ensure easy movement of the studs in the rails.

The levers 20 are also offset so that said levers may be operatively connected to the traveler nuts 18 by links 23 which have the ends thereof pivotally connected to the nuts 18 and to the levers 20.

Intermediate the ends of the plate 12, preferably contiguous to one end thereof and within easy reach of the operator of an automobile, is a gear operating mechanism for imparting rotation to the screw shaft 16, and this mechanism is best shown in Figures 2 and 5. Fixed on the screw shaft 16, at the intermediate bearing 15, is the hub portion 24 of a beveled gear 25 meshing with a beveled gear 26, mounted on a stub 27 journaled in a bearing 28 mounted in the plate 12. The stub shaft 27 has a tang 29, and mounted thereon is the inner end of a crank or handle 30 by which the shaft 27 may be rotated and by virtue of the beveled gears 25 and 26 impart rotation to the screw shaft 16.

By reference to Figures 1 and 2, it will be noted that the screw shaft has its thread portions right and left hand so that rotation of said shaft will cause the traveler nuts 18 to be moved to and from each other longitudinally of the shaft. The levers 20 are arranged to be swung towards each other in arcs having centers on the bearings 19, and it is in consequence of this constructive arrangement of parts that the sash 7 may be raised from the full line position, shown in Figure 4, to the dot and dash position for ventilating purposes at the bottom of said sash. The screw shaft 16 and the traveler nuts 18 obviate the necessity of using any clutch or other form of locking device for preventing accidental shifting of the sash 7 when set in adjusted position, said shaft and nuts constituting an irreversible gearing mechanism by which the sash may be easily and safely adjusted. I attach considerable importance to the fact that this mechanism is a bench assembled proposition extending longitudinally of the header and is concealed therein, so that the sash regulating device does not interfere with the interior finish of the automobile body.

It is thought that the operation and utility of my sash regulating device will be apparent without further description, and while in the drawings there is illustrated a preferred embodiment of my invention, it is to be understood that there are many mechanical equivalents suggested by the screw shaft, traveler nuts and levers. For instance, the beveled gear 25 may be in the form of a held rotatable nut to cause reciprocation of the shaft for shifting pivoted levers or cams operatively engaging the sash. Because of these and other mechanical equivalents, I do not care to confine my invention to the precise construction shown and decribed, other than as set forth in the appended claims.

What I claim is:—

1. In a windshield construction wherein a sash is adapted to be raised into a header to provide a ventilating opening under said sash;—a sash regulating device mounted in the header, said device comprising a plate attached to said header, levers on said plate and swingable towards each other and operatively connected to said sash for raising and lowering said sash, spaced apart lever actuating means movable longitudinally of said plate, said lever actuating means including non-rotatable traveler nuts slidable against said plate and operatively connected to said levers, and means between said spaced apart lever actuating means adapted for operating said means to cause movement of said sash.

2. In a sash regulating device wherein a sash is adapted to be raised and lowered;— a plate disposed at the upper end of said sash, swingable levers on said plate operatively engaging the upper end of said sash for raising and lowering said sash, a screw shaft rotatably supported by said plate, means at the ends of said shaft adapted for swinging said levers when said shaft is rotated, and means intermediate the ends of said shaft and supported in part by said plate to facilitate rotating said shaft.

3. A sash regulating device as called for in claim 2 wherein the first mentioned means includes traveler nuts on said shaft movable in synchronism to and from each other by said shaft, and links connecting said nuts to said levers.

4. A sash regulating device as called for in claim 2 wherein the last mentioned means includes a crank equipped shaft supported by said plate, and beveled gears adapted to transmit power from said shaft to said screw shaft.

5. In a windshield construction, a header, a sash slidable therein, spaced pivoted levers operatively connected to the upper edge of said sash adapted for raising and lowering said sash in said header, traveler nuts adapted for moving said levers, a screw shaft supported in said header and operatively supporting said traveler nuts, and means in said header to facilitate rotating said shaft to cause travel of said nuts and movement of said levers for sash adjusting purposes.

In testimony whereof I affix my signature.

LEONARD A. MULLIGAN.